Patented Mar. 3, 1953

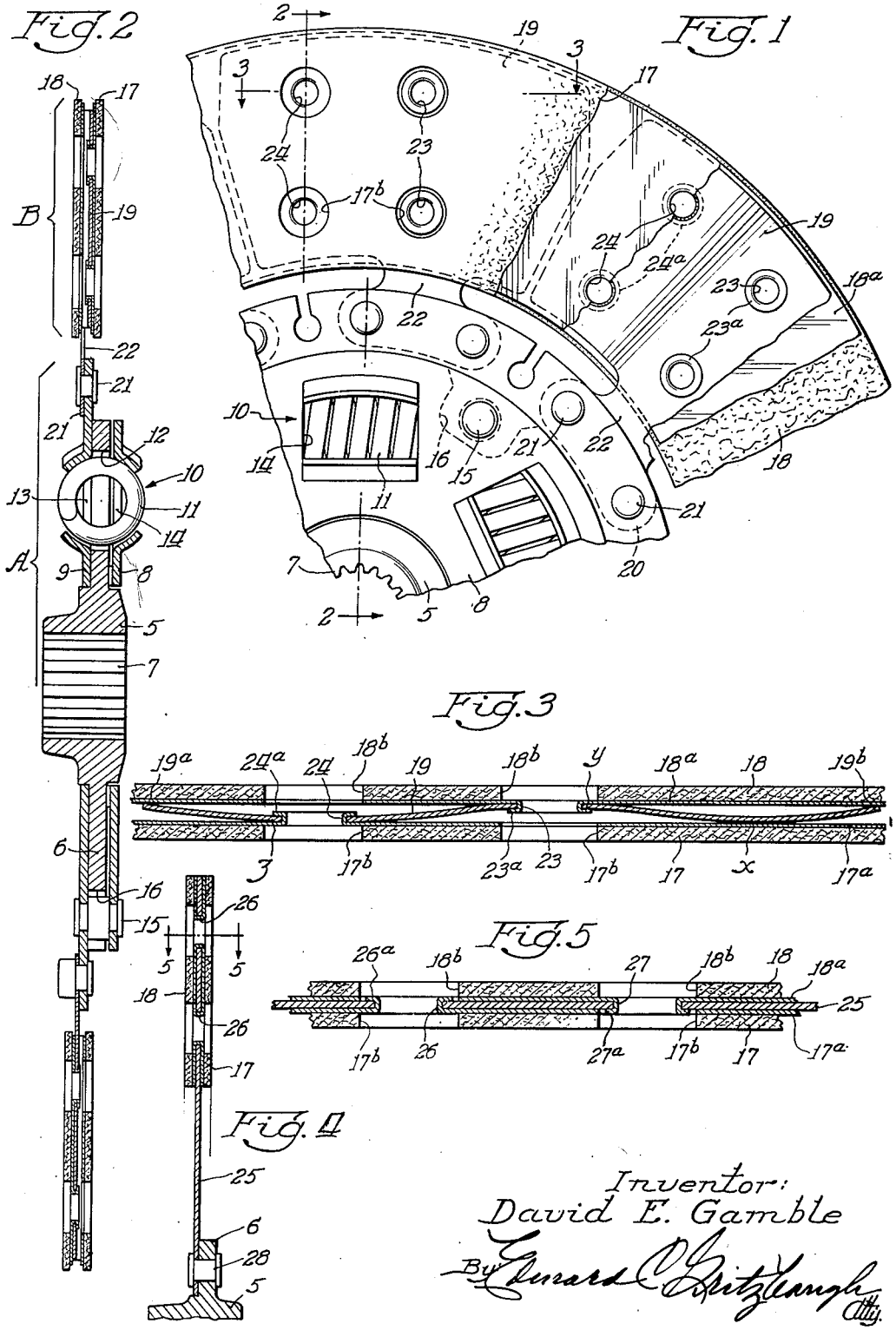

2,630,199

UNITED STATES PATENT OFFICE 2,630,199

CLUTCH DRIVEN PLATE WITH BONDED LININGS

David E. Gamble, Tucson, Ariz., assignor to Borg-Warner Corporation, Chicago, Ill., a corporation of Illinois Application December 15, 1948, Serial No. 65,463

3 Claims. (Cl. 192—107)

The present invention relates to driven plates for friction clutches and has to do particularly with a novel structure for mounting the ring-like friction facing members on the dis-like central region or hub assembly of a clutch driven plate.

It is one of the principal objects of this invention to simplify the construction of a clutch driven plate such as contemplated herein, and to improve the efficiency and operation of such driven plate.

Another principal object resides in providing a novel facing mounting arrangement wherein the spoke-like cushion members which extend radially outwardly from the hub assembly, are not directly attached to the friction facing members by means of rivets or the like, thereby dispensing with the operation of upsetting the rivet heads in the manner which has long been the practice.

Still another principal object resides in providing an improved mounting means for the friction facing members, such means being separate from but are secured to and carried by the cushions and in turn are cemented, bonded, or otherwise similarly secured to the opposing surfaces of the friction facing members. This arrangemen wholly dispenses with the use of rivets for yieldably assembling the facings and cushions of a clutch driven plate.

It is also a principal object hereof to provide a novel mounting arrangement for the spaced friction facings, such means comprising ring-like flat plates, bonded to confronting surfaces of the facing member by cement or other adhesive means, and such plates are anchored to the cushion members, or to a hub carried plate, by eyelets or grommets which are formed integral with said backing plates.

A still further object resides in anchoring annular backing plates by headless means to an intermediate plate carried by the clutch hub and extending radially outwardly between the facings such backing plates having the facing members cemented, bonded, or similarly secured to said backing plates.

Additional objects, aims, and advantages of the invention contemplated herein will be apparent to persons skilled in the art after the construction and operation of the clutch driven plate are understood from the within description.

It is preferred to accomplish the numerous objects of this invention, and to practice the same, in substantially the manner hereinafter fully described and as more particularly pointed out in the appended claims. Reference is now made to the accompanying drawings which form a part of this specification.

In the drawings:

Fig. 1 is a fragmentary view, partly broken away, and showing a typical embodiment of a clutch driven plate made in accordance with the present invention;

Fig. 2 is a section taken diametrically through the clutch plate, generally along the plane of line 2—2 of Fig. 1;

Fig. 3 is a fragmentary section taken along the plane of line 3—3 on Fig. 1 and drawn to a larger scale;

Fig. 4 is a radial sectional view, similar to Fig. 2, illustrating a modified form of the herein improvements; and Fig. 5 is a fragmentary section taken along the plane of line 5—5 on Fig. 4.

The drawings are to be understood as being more or less of a diagrammatic character for the purpose of disclosing typical or preferred forms of the invention contemplated herein, and in these drawings the same reference characters identify like parts in the different views.

It is apparent from an inspection of the drawings that the improvements contemplated herein comprise novel means for connectively mounting the friction facing rings on the central hub of a clutch driven plate, such means being comprised of a plurality of sheet metal members which are arranged side by side between the facing rings, and certain of said sheet metal members are attached by cement or bonding to the respective facing rings. Also novel means provide cooperative association between the sheet metal members by connecting two of said members by headless means such as cylindrical embossments integral with one member and passed through an adjacent member where each embossment is crimped down upon such adjacent member to connect said two members. The remaining member may be similarly, or otherwise, attached to one of the aforesaid two connected members.

In the embodiment of the invention which is shown in Figs. 1, 2 and 3, the clutch driven plate generally comprises an inner disc-like hub assembly A and an outer annular assembly B which is carried by and extends radially outwardly from the hub assembly. The hub assembly or central region A may comprise a hub 5 having a flange 6 extending radially outwardly therefrom, said hub having therein a splined bore 7 whereby the clutch plate is drivingly mounted on a rotatable driven shaft and is adapted for sliding movement longitudinally thereon. At one side of the hub flange 6 there is a washer-like plate member 8 which extends outwardly from the body of the hub to adjacent the other periphery of hub flange 6. At the other side of the hub flange there is a sheet metal disc 9 extending radially outwardly from the body of the hub to beyond the outer periphery of the flange 6 as shown in Fig. 2.

There is a vibration dampener assembly, identified generally by the numeral 10 for providing a flexible or yieldable driving connection between the intermediate disc 9 and the hub 5. This vibration dampener assembly 10 comprises an annular array of coiled springs 11 which are seated in openings 12 or recesses in the hub flange and also in openings or recesses 13 in the disc 9. The washer 8 has a corresponding number of openings or recesses 14. All of these openings or recesses are in registering axial alignment with each other to receive the coiled springs 11, which springs are under compression and at their ends they abut against the end walls of the registered openings or recesses. The disc 9 and the washer 8 are connected together by a plurality of spacer rivets or spools 15, the barrels of which are positioned in recesses or notches 16 extending radially inwardly from the periphery of hub flange 6, thus the disc and washer are tied together for simultaneous movement whilst they are maintained in parallel spaced relationship. As seen in Fig. 1, the notches or recesses 16 in the hub flange are of greater circumferential dimensions than the diameters of the rivet barrels, thus permitting relative rotative movement between the hub flange and the disc-washer assembly 8—9. The radial dimensions of hub flange openings 12 are greater than the diameters of the coiled springs 11, and the openings 13 and 14 in the disc and washer assembly are less than the diameters of the coiled springs 11. By reason of this last mentioned arrangement, the springs will be maintained in proper relationship to the other portions of the vibration dampener assembly 10 and dislodgment of the springs, due to centrifugal force, is prevented. It will be appreciated that the particular vibration dampener assembly hereinbefore described may be varied, or it may be dispensed with since it does not comprise a portion of the present invention.

The outer region of the clutch plate comprises the friction facings 17 and 18, which are preferably two annular flat rings spaced axially from each other by suitable means which also connect these facings to the central region or hub assembly A of the clutch plate. The inner peripheries of the facings are spaced radially outwardly from the outer periphery of the intermediate disc or hub plate 9. The facing members, which may be any suitable friction material, are adapted under clutch packing pressure to be packed between the flywheel and the axially shiftable pressure plate of a friction clutch assembly. When the pressure plate is released, these facings are adapted to assume their normally spaced relationship with respect to each other.

The facing mounting arrangement, disclosed herein by way of a typical example, may comprise a plurality of structurally separate cushion members 19 which are circumferentially elongated, as shown in Fig. 1, and they are of a generally rectangular shape, and are arranged in spaced end-to-end order to provide approximately continuous annular cushion means between the facings. The body portions of the cushions 19 lie between the facings 17 and 18 and have a curved or wavy formation defining peripherally spaced radially extending lands $x$, $y$, and $z$, the crests of the waves being closely adjacent to the confronting surfaces of the facings. It has been the usual practice to have the crests of the waves in actual contact with the respective facings to which they are secured by rivets. In the present construction, the cushions 19 are not directly attached to either of the facing members, and the use of rivets has been eliminated as will be later explained herein.

The radially inner portions of the cushions have circumferentially elongated feet 20 which overlie the outer peripheral region of the intermediate plate or disc 9 and are attached to this disc by spaced rivets 21. The foot portions 20 of the cushions are connected to the respective body portions by reduced neck portions 22, each having less circumferential width than either the cushion body or the cushion foot, and connect these parts in operative association with each other.

The facing members 17 and 18 are bonded in any suitable manner to metal backing plates 17a and 18a respectively, and the bodies of the cushions 19 lie between these backing plates in the manner shown in Fig. 3 so that the cushions may be attached thereto in any suitable manner.

The lands $x$ and $z$ are close to the facing 17 while land $y$ is close to the other facing 18. Thus it is apparent that each land is in contact with at least one of the respective backing plates 17a and 18a. The radial end edges 19a and 19b of each cushion extend toward and may have contact with the backing plate 18a.

The means for attaching the cushions to the backing plates preferably comprise deformed portions of said backing plates having cylindrical cross-section, as clearly shown in Fig. 3. These cylindrical deformations are defined by grommet-like ferrules or collars 23 and 24 which may be stamped or punched out from the respective plates and have their shanks inserted inwardly through apertures made in the lands $y$ and $z$ of the cushion and have their lips 23a and 24a bent down firmly or crimped against the cushion body, as clearly shown in Fig. 3. The facings are provided with bores 17b and 18b which register with the ferrules or collars to accommodate the latter when the clutch driven plate is under clutch packing pressure. It will be understood that since the radial end edges of a cushion are adapted to engage a backing plate, such edges cannot rub or cut into the adjacent regions of the friction facings during operation of the clutch.

The washer 8 and the central or intermediate disc 9 are preferably made of heavy sheet steel of a sufficient gauge to be nonyielding, and the cushions and the backing plates are formed from thin sheet steel. The metal of the cushions is of a yieldable character and is strong enough to transmit torque from the flywheel to the driven shaft on which latter the clutch driven plate is mounted. The cushions are preferably pretempered clock spring steel, such as Rockwell 40–44, "C" scale, and of a gauge within the range of .022 to .027. The backing plates may be made from thin sheet steel of approximately .022 gauge, and since the facings are cemented to these backing plates, no clearance is required for rivet heads. It will also be apparent that the thickness of the friction facing members may be materially reduced, and in this connection it is stated that these facings are preferably only $\frac{1}{16}''$ in thickness as compared with $\frac{1}{8}''$ thick facing usually employed in clutch driven plates.

Figs. 4 and 5 illustrate an alternative arrangement of the present invention. As in the previously described structure the facing members 17 and 18 comprise rings of friction material which are cemented, bonded or similarly secured to the annular backing plates 17a and 18a respectively, such plates having dimensions and shapes conforming generally with the facing members. These backing plates are carried directly by a supporting plate 25 and are secured thereto by headless means which are defined by cylindrical deformations of the respective backing plates, and comprise grommet-like ferrules or collars 26 and 27 formed out of the backing plates. After the shanks of ferrules or collars have been inserted through apertures in the supporting plate 25 their protruding lips 26a and 27a are turned down against the adjacent surface of the supporting plate as shown in Figs. 4 and 5. In order to accommodate the lips of the ferrules or collars, the facings are bored or recessed as at 17b and 18b. The supporting plate 25 may extend radially inward to and be secured to the hub flange 16 by rivets 28, or such plate may take the form of a separate annulus extending inwardly of the inner periphery of the facing members and suitably secured to the outer margin of a hub-carried intermediate plate.

It will be apparent that the claims hereof are of sufficient scope to include a clutch driven plate arrangement wherein the hub carried plate terminates radially inwardly of the inner peripheries of the annular facing members and has sheet metal segments secured to its margin which extend radially outwardly between the facing member for attachment to the backing plates.

While this invention has been described in detail in its present preferred form or embodiment, it will be apparent to persons skilled in the art after understanding the within improvements that various changes and modifications may be made therein without departing from the spirit or scope thereof. It is aimed in the appended claims to cover all such changes and modifications.

What is claimed is:

1. In a friction clutch driven member having a radial central region; a pair of annular friction facing members radially outward of said central region and having confronting flat faces axially spaced from each other; and a sheet metal assembly structurally separate from said central region for mounting said facing members thereon, said assembly comprising a plurality of structurally separate independent sheet metal cushion segments attached at their inner portions to said central region and lying between said flat faces of the friction members, said cushions having therein radial lands in planes off-set axially from each other and extending in opposite directions towards the respective facing members; flat annular disc-like backing plates of sheet metal arranged in parallel planes radial to said central region and axially spaced from each other, each backing plate having contact with opposed surfaces of a cushion land and the flat face of a friction member which are proximate each other and being bonded by cement to the flat surfaces of the respective friction members; and cylindrical eyelets integral with each backing plate and projecting away from the bonded surfaces of each plate and in a direction opposite to the eyelets of the other backing plate to protrude through the lands of said cushion, said protruding portions of said eyelets being upset against the surfaces of said cushions which confront the other plate, said eyelets being effective to secure each cushion to both backing plates and prevent relative movement between the attached portions of said plates and cushions but permitting free flexing action of the regions of the cushions which are at the sides of the attached portions thereof.

2. A friction clutch plate comprising, a radially flanged hub; a non-yielding central disc carried by said hub and extending radially outward beyond said flange; a pair of axially spaced annular friction facings arranged outwardly beyond the periphery of said disc and having flat confronting surfaces; a plurality of structurally separate yieldable cushions of thin spring steel arranged in annular array between said friction facings and attached at their radially inner portions to said disc, said cushions having a wavy formation defining spaced radial lands at the crests of the waves; flat annular disc-like backing plates arranged in planes which are parallel to said central disc, said backing plates being spaced outward from said central disc and interposed between said cushions and said friction facings in contact with the cushion lands, said backing plates being bonded by cement to the flat surfaces of said friction facings; and hollow eyelets of generally cylindrical cross-section and formed integrally with the respective backing plates, said eyelets projecting in opposite directions from the respective backing plates and passing through the cushion lands and having their ends bent down thereon to secure said cushions to said backing plates and prevent relative movement between the attached portions of said plates and cushions but permitting free flexing action of the regions of the cushions at the sides of said deformable members.

3. A friction clutch plate having a radial central disc, and a pair of axially spaced annular friction facings having flat confronting radial surfaces parallel to the plane of said disc and arranged radially outward beyond the periphery of said disc; and a sheet metal assembly structurally separate from said disc for mounting said facings thereon, said assembly comprising a plurality of structurally separate spring cushions between said friction facings and attached at their radially inner regions to the outer periphery of said disc, each cushion being deformed to define spaced radial lands extending in opposite axial directions from the body portion of each cushion and towards the respective facings; flat annular disc-like backing plates separate from said cushions and disc arranged in radial planes parallel thereto, each plate being interposed between said cushions and one friction facing and in contact with an adjacent land of each cushion, said backing plates being bonded by cement to the flat radial surfaces of said friction facings; and hollow eyelets of generally cylindrical cross-section and formed integrally with the respective backing plates and projecting in opposite directions through proximate land portions of said cushions, the ends of said eyelets being bent down upon said cushions thereby securing each cushion to both backing plates, and said backing plates and cushions connect both facings to said central disc.

DAVID E. GAMBLE.

REFERENCES CITED

The following references are of record in the file of this patent:

UNITED STATES PATENTS

| Number | Name | Date |
|---|---|---|
| 1,400,565 | Miller | Dec. 20, 1921 |
| 1,974,821 | Cunningham | Sept. 25, 1934 |
| 2,221,821 | Thelander | Nov. 19, 1940 |
| 2,264,192 | Wellman | Nov. 25, 1941 |
| 2,283,112 | Wemp | May 12, 1942 |
| 2,318,620 | Nutt | May 11, 1943 |
| 2,381,941 | Wellman | Aug. 14, 1945 |

FOREIGN PATENTS

| Number | Country | Date |
|---|---|---|
| 499,589 | Great Britain | Jan. 19, 1939 |
| 779,669 | France | Apr. 10, 1935 |